Nov. 17, 1959     E. G. VENABLE     2,912,792
ORNAMENTAL CURB
Filed Feb. 25, 1958     2 Sheets-Sheet 1
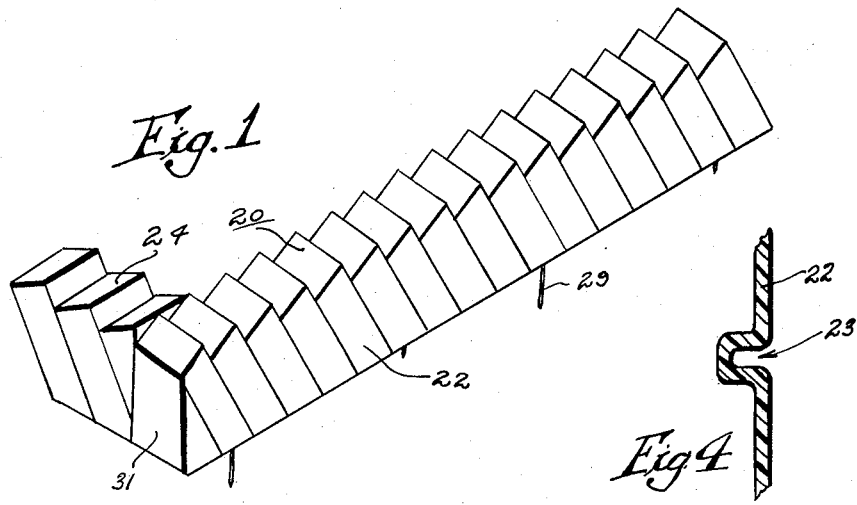
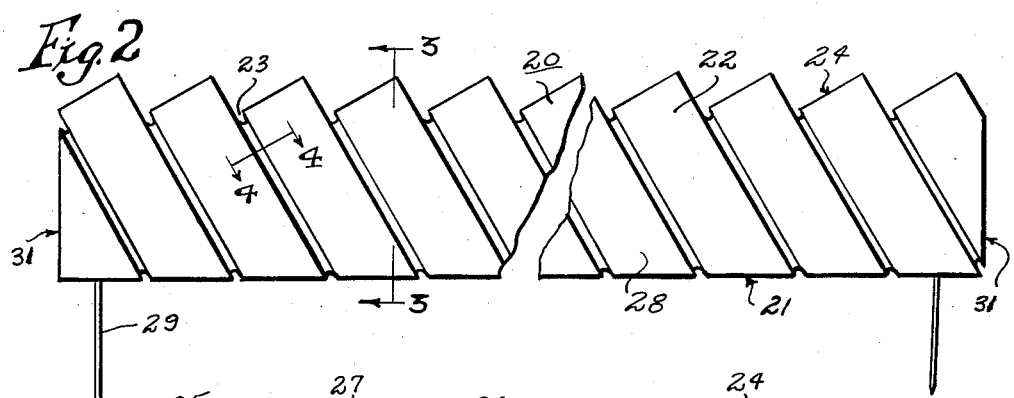
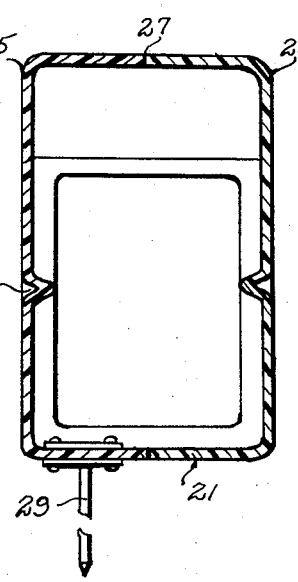
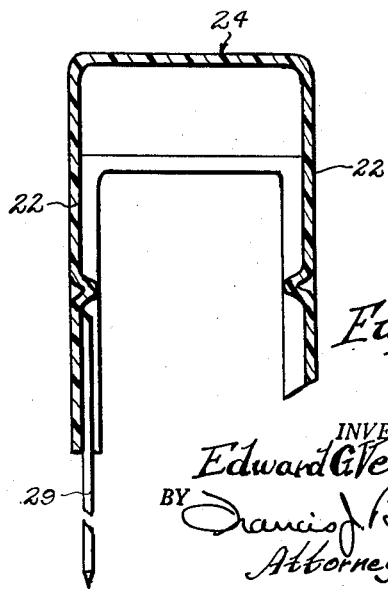
INVENTOR.
Edward G. Venable
BY Francis J. Bouda
Attorney Nov. 17, 1959  E. G. VENABLE  2,912,792
ORNAMENTAL CURB
Filed Feb. 25, 1958  2 Sheets-Sheet 2
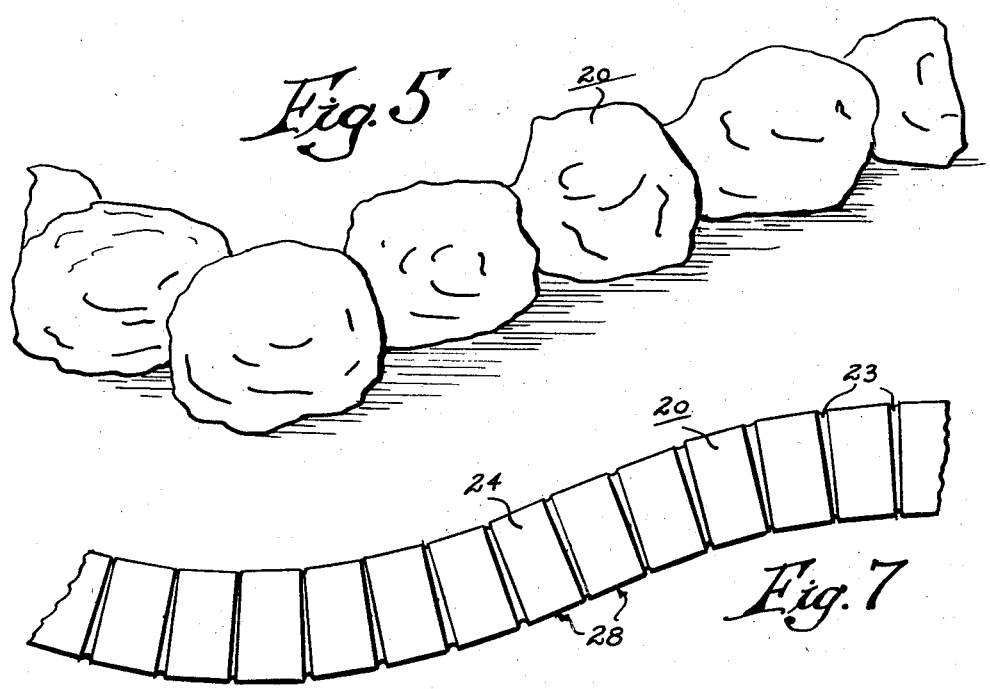
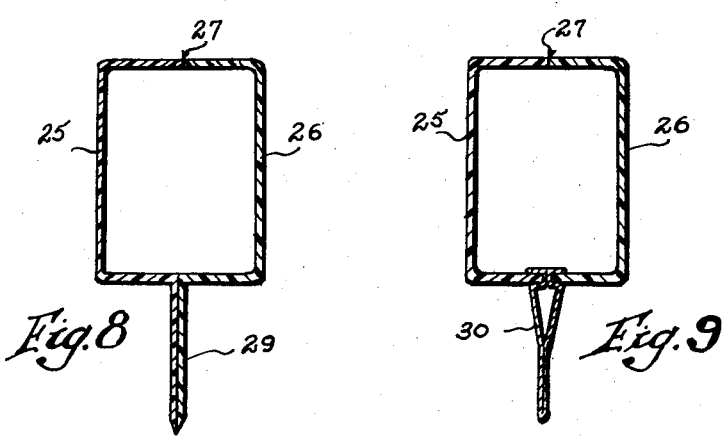
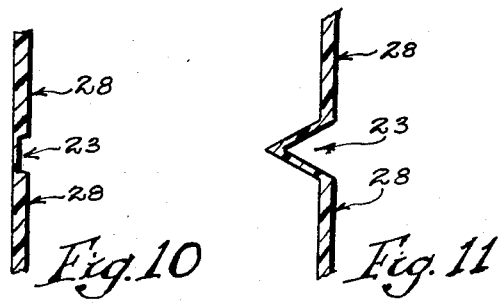
INVENTOR.
Edward G. Venable
BY
Attorney United States Patent Office 2,912,792
Patented Nov. 17, 1959

2,912,792
ORNAMENTAL CURB
Edward G. Venable, Chester, Pa.
Application February 25, 1958, Serial No. 717,800
1 Claim. (Cl. 47—33)

The present invention is related to fences and curbs and also to garden and lawn markers, as well as to traffic guides, and is particularly constructed and arranged to simulate a border for roads, walks and lawns.

One who has been confronted with the problem of caring for lawns and flower beds is aware of the difficulty of maintaining a neat and trim edge or border where the lawn meets the flower bed or a walk or roadway, especially if the edge of the grassy surface is outlined with stones, bricks or a curb of one sort or another. Quite often gardeners or landscape architects arrange a continuous or spaced row of bricks or whitewashed stones as a border for roadways or flower beds or the like, but such arrangement makes most difficult the cutting and trimming of the lawn closely adjacent the bricks, stones etc. Manufacturers of garden or lawn tools have capitalized on such problems and have provided a variety of special tools to supplement lawn mowers and to assist in the trimming of the grass around such objects. My invention, for the first time makes such special apparatus unnecessary and permits the gardener to do all the trimming without such auxiliary devices.

With the foregoing in mind, one object of the present invention is to provide a curb which simulates brick or stone arranged in a manner which permits ready and effortless removal thereof from its designated location for a short period of time (during the time the grass is being mowed in the area normally occupied by the curb) and which also permits its easy and ready replacement.

Another object of the invention is to provide a curb of plastic molded to simulate brick or stones and which curb can be arranged in curving or serpentine lines to imitate rows of brick or stones edging a walk or to define any desired area, whether regular in outline or curved or of irregular shape.

Another object is to provide a lightweight, portable curb having anchor means to secure the curb in place.

Another object is to provide a generally hollow, lightweight, box-like structure simulating a row of members such as bricks or stones and constructed and arranged with spaced portions which appear as joints between the members and which permit the adjustment of the structure into a curved line.

Yet another object is to provide a lightweight, portable curb simulating a row of heavy objects, said curb having anchoring means to secure it in position on the ground and which resist horizontal movement thereof but which allow for easy lifting of the curb to move it to another location.

Further objects will be apparent from a consideration of the attached specification, claims and drawings.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

With the foregoing objects in mind, the present invention may be better comprehended by reference to the accompanying drawings wherein:

Figure 1 is a perspective view of one form of the invention constructed and arranged as a curb simulating a row of bricks set into the ground at an angle to the horizontal.

Figure 2 is a front elevational view of the device of Figure 1.

Figure 3 is a vertical cross-sectional view taken along line 3—3 of Figure 2.

Figure 4 is a fragmentary cross-sectional view taken along line 4—4 of Figure 2.

Figure 5 is a perspective view of another embodiment of the present invention constructed and arranged to simulate a row of stones, and fabricated in the nature of a hollow, inverted box.

Figure 6 is a view similar to Figure 3, being a vertical cross-sectional view of a modified form of the present invention particularly adapted for manufacture of the embodiment shown in Figure 5, and which enables one-piece fabrication of sections of the curb.

Figure 7 is a top plan view of a section of the curb, similar to that shown in Figure 1, arranged to simulate a curved row of blocks placed side-by-side.

Figure 8 is a vertical cross-sectional view similar to Figure 3, of another embodiment of the present invention.

Figure 9 is a vertical cross-sectional view similar to Figures 3 and 8, of still another embodiment of the present invention.

Figure 10 is a fragmentary cross-sectional view similar to Figure 4.

Figure 11 is a fragmentary cross-sectional view similar to Figures 4 and 10.

The present invention, in one embodiment, consists of a generally box-like or tube-like structure constructed of two sections 25 and 26 molded of plastic, rubber or any suitable material in a manner which simulates the customary heavy bricks, stones, logs or like devices arranged in rows to provide a curb constructed and arranged to outline or define a prescribed area, or edge of an area. To that end, the structure 20 may be constructed in the manner shown in Figures 1 to 4 and Figure 7, and consists of a pair of mating channel-like members molded of form-retaining but flexible material such as polyethylene. The bottom portions 21 are substantially flat or arranged in a plane to provide a base upon which the structure may rest. The side-walls 22 simulate the sides of customarily solid, recognizable structures or objects such as bricks set at an angle to the base and parallel to each other, with portions 23 recessed or indented to simulate joints between the brick-simulating members and to provide flexible joints between the said members or surface portions 28 to enable adjustment of the curb in a curved or serpentine manner. The top surface 24 may be irregular, as in Figure 1, to simulate the tops of the bricks, or in any desirable manner.

It is to be understood that the present invention may be ornamented to simulate any desired array of bricks, stones, or the like, arranged in any manner desired. The general purpose being to give the appearance of a curb assembled from a plurality of objects such as bricks, stones or the like.

The two sections 25 and 26, being complementary, are joined together along the mating line 27 and cemented together or otherwise secured to provide the tube-like structure 20 shown in Figures 1 to 4. The portions 23 permit adjustment and thus provide means to arrange the curb in a curved line.

The joint-simulating sections 23 need not be in the form shown in Figure 4 but may be generally V-shaped or formed in any other manner (as, for instance, as shown in Figures 10 and 11) which provide for relative movement between adjacent surface wall portions 28, either toward each other or away from each other, to permit the arrangement of the curb in a curved line, as shown in Figure 7. The indentations 23 may be thinner in cross-section than the surface portions to provide greater flexibility.

Pegs or anchors 29 may be fastened to the bottom surface 21 in any suitable manner. These pegs may be made of metal and inserted in the molds at the time of forming each half-section, and may be in the form illustrated in Figure 3. However, the anchors 29 may be formed of the same material as the curb and molded integrally with the side-walls 22, as shown in Figure 8. Alternatively, the anchors may be relatively inexpensive prongs or clips 30 which are attached to the two sections 25 and 26 at the time of joining them together, as shown in Figure 9. In any event, the precise method of fabrication is not intended to be limiting, and may be adapted to the most convenient and economical methods available, it being understood that the anchors may be eliminated entirely, if desired.

The ends 31 of the curb are preferably finished in a manner which permits alignment of the two (or more) sections of the curbs, either in a continuous manner to provide longer curbs, or at an angle to each other, as shown in Figure 1. To that end, the ornamentation of the exterior surface of one end is intended to be complementary to the surface of the other end (and also, if desired, to the side-wall) so that close matching of the sections may be made without revealing the joint or mating line between the sections.

The present invention thus provides a neat, regular and substantial-looking structure giving the appearance of well-known forms used as curbs. However, because of the method and materials used in the fabrication of the devices, the structures may be readily and easily removed from their usual position and therefore a lawn mower may be operated above the usual location of the devices. Thereafter the curb may be replaced in its previous position, and thus the need for tedious and time-consuming trimming is eliminated. Furthermore, the device may be fabricated at less cost than the price of equivalent curbs made of brick, and the labor and expense of installation is reduced to a minimum, or eliminated completely.

The present invention may be embodied in other specific forms without departing from the spirit or essential attributes thereof, and it is therefore desired that the present embodiments be considered in all respects as illustrative and therefore not restrictive, reference being had to the appended claim rather than to the foregoing description to indicate the scope of the invention.

Having described my invention, what I claim as new and desire to protect by Letters Patent is the following:

In a curb or garden edging, an elongated, generally hollow box-like flexible one-piece member, having at least three sides each of which has indentations therein extending generally transversely to the larger dimension of the member in a manner which permits the member to flex in a curved or sinuous line, a plurality of pegs securely affixed to the member and extending downwardly transverse to the larger dimension of the member whereby to anchor said member to the ground, said member being formed of lightweight plastic material of sufficient thickness between indentations to be form-retaining, said indentations being relatively thin webs which permit relative movement of the portions of the sides intervening the indentations.

References Cited in the file of this patent

FOREIGN PATENTS

| | | |
|---|---|---|
| 59,545 | Austria | June 10, 1913 |
| 513,971 | Germany | Dec. 5, 1930 |
| 460,051 | Great Britain | Jan. 20, 1937 |